US007018155B1

United States Patent
Heberling et al.

(10) Patent No.: US 7,018,155 B1
(45) Date of Patent: Mar. 28, 2006

(54) REFUSE CONTAINER TRANSPORTER AND LIFT

(75) Inventors: James R. Heberling, Elk Grove, CA (US); Richard C. Remund, Sacramento, CA (US)

(73) Assignee: Sacramento City Unified School District, Sacramento, CA (US)

( * ) Notice: Subject to any disclaimer, the term of this patent is extended or adjusted under 35 U.S.C. 154(b) by 71 days.

(21) Appl. No.: 10/329,292

(22) Filed: Dec. 23, 2002

Related U.S. Application Data

(60) Provisional application No. 60/355,179, filed on Feb. 8, 2002.

(51) Int. Cl.
*B65B 21/02* (2006.01)

(52) U.S. Cl. .................. 414/408; 414/421; 414/425; 414/428

(58) Field of Classification Search ............. 414/408, 414/421, 425, 428
See application file for complete search history.

(56) References Cited

U.S. PATENT DOCUMENTS

| 1,492,675 | A | | 5/1924 | Clark et al. |
| 4,911,600 | A | * | 3/1990 | Zelinka et al. ............ 414/408 |
| 5,002,450 | A | | 3/1991 | Naab |
| 5,372,470 | A | | 12/1994 | Wilke et al. |
| 5,406,996 | A | | 4/1995 | Wagner et al. |
| 5,582,500 | A | | 12/1996 | Morris |
| 6,379,099 | B1 | * | 4/2002 | Novak ....................... 414/421 |

FOREIGN PATENT DOCUMENTS

| GB | 908178 | 10/1962 |
| GB | 908190 | 10/1962 |
| IT | 595656 | 7/1959 |
| JP | 405330798 | 12/1993 |

OTHER PUBLICATIONS

Applied Products, Inc., "Rubbermaid Toter Systems, In/hospital Toter systems" advertisement, undated, 2 pages.

* cited by examiner

*Primary Examiner*—Joseph Valenza
(74) *Attorney, Agent, or Firm*—John P. O'Banion

(57) ABSTRACT

A lift apparatus for conveying, lifting and at least partially inverting a refuse container for emptying into a dumpster or a refuse receptacle. The apparatus preferably has a base with wheels and a handle to facilitate transport. In one embodiment, the handle telescopes vertically and is hook shaped and adapted for engaging the lip of a dumpster or garbage chute. A pair of offset pivot arms is pivotally mounted to the frame and to a bin carriage, into which a refuse receptacle may be received. Application of a pivoting force to the pivot arms lifts and at least partially inverts the bin carriage for emptying the refuse container. Preferably a damper is provided on bin carriage movement as well as a locking mechanism to prevent bin carriage movement while being conveyed. The device may be operated manually, or adapted with mechanical power output devices to simplify lifting.

60 Claims, 12 Drawing Sheets

REFUSE CONTAINER TRANSPORTER AND LIFT

CROSS-REFERENCE TO RELATED APPLICATIONS

This application claims priority from U.S. Provisional Application Ser. No. 60/355,179 filed on Feb. 8, 2002, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

This invention pertains generally to container transporting devices, and more particularly to a portable refuse container transporter and lifting apparatus that permits the user to transport a waste container to a refuse repository, such as a dumpster or a chute for receiving refuse, and easily lift and invert the container to empty its contents into the dumpster or chute.

2. Description of the Background Art

The disposal of waste materials in many settings typically involves the manual placement of refuse in cylindrical refuse containers of various volumes. The contents of such refuse containers is then unloaded into larger refuse depositories that are emptied into still larger refuse depositories or trucks to be transported to a suitable landfill or to a refuse transfer station.

A common refuse container may have a volume ranging from below approximately 30 gallons up to approximately 80 gallons. Some refuse containers known in the art may be attached to a wheeled platform or have integrated wheels to facilitate the movement of the container. Containers with integrated wheels often require the container to be tipped when transporting the container and can be quite cumbersome to unload when the contents of the container are heavy.

In numerous settings, such as a restaurant or school setting, the material collected in the container may have considerable weight. Waste food and remnants may often contain a high percentage of liquids thereby making the container difficult to lift and maneuver. Emptying of the container generally requires that it be lifted to a substantial height, such as the top of the dumpster, which may be approximately four to five feet in height, whereupon the refuse container must be substantially inverted at this height for emptying its contents. The weight of the container coupled with the awkward angles involved and lack of mechanical advantage, can lead to accidents, sprains, pulled muscles, and various repetitive stress forms of injury. In practice, therefore, the size and useful capacity of a refuse container used in heavy waste settings can be substantially limited by the capability of a laborer to lift and empty the container. Furthermore, the current physical demands placed on those required to empty such containers limits who may perform the task.

A number of devices have been developed to hoist and dump the contents of a garbage can or the like into a garbage truck or garbage chute to reduce the hand labor required to perform this task. These devices are normally permanently mounted to the ground or floor, or to a large permanent waste receptacle. For example, the armature of a garbage truck is permanently mounted to the body of the truck. The use of these mechanisms requires the refuse container to be moved from its original location to the location of the permanent lift and further require the container to be placed in the lift mechanism. The lift mechanism in these cases is not well suited for use with dumpsters and other refuse receptacles which are subject to movement, automated removal, or replacement, due to dumpster design variations and the possibility of damage when these dumpsters are emptied or replaced. Accordingly, these mechanisms are limited in usefulness to suitably permanent waste receptacles and locations.

Accordingly, a need exists for a container transport and lift that is easy to use and inexpensive to manufacture that can efficiently transport and hoist a container and deposit its contents into a dumpster or chute with reduced risk of strain or injury. The present invention satisfies these needs, as well as others, and generally overcomes the deficiencies found in existing equipment.

BRIEF SUMMARY OF THE INVENTION

The present invention is a refuse container transport and lift apparatus that can easily engage a refuse depository, such as a dumpster or refuse chute or the like, and then permit the refuse container to be emptied with little effort. The apparatus allows for transport, and lifting, toward at least partial inversion, of a refuse container for emptying garbage therefrom into a refuse receptacle, or dumpster. The apparatus comprises a frame having at least two wheels adapted to provide rollable transport thereof, a column connected to the frame, a bin carriage adapted for receiving a refuse container, and a plurality of angularly offset parallel pivot arms coupled between the column and the bin carriage. In response to an applied pivot force, manually or from a mechanical power unit, the bin carriage is guided by the pivot arms upwardly and is rotated toward at least partial inversion of the bin carriage and retained refuse container for emptying waste into a dumpster or other refuse receptacle.

By way of example, and not of limitation, the invention includes a base with a central vertical column and at least two wheels that allow free movement of the base, wherein the apparatus with a received refuse container within a bin carriage may be rollably transported to a large refuse receptacle or the disposal chute which leads into a refuse receptacle. Optional wheels are preferably incorporated under the bin carriage, which also supports the load of the refuse container, and aids in stabilizing the apparatus while allowing for movement without the need to tilt the apparatus during transport. At least one pair of parallel lever arms are pivotally coupled to the base at one end and pivotally coupled to a bin carriage at the other end. The bin carriage is configured for retaining the refuse bin during the lifting operation. In the preferred embodiment, the lever arms are mounted to an angled mount, or bracket, near the top of the vertical column such that the distal end of the lever arms are linearly offset. The bin carriage is preferably configured to allow for the receipt of an assortment of refuse container sizes, including containers which already incorporate wheels on their bases. At least one long stroke cylinder is preferably utilized to control motion between the bin carriage and the vertical component of the base. The long stroke cylinder may be coupled at various locations, such as between at least one lever arm and the base, for dampening the pivotal movements of the lever arms, or additionally to reduce the forces required when lifting the bin carriage subject to a loaded refuse container.

The bin carriage is configured to preferably receive variously sized and shaped containers, in particular those having either a circular or square cross section (typically with rounded-corners). The bin carriage, preferably includes a frame having a plurality of carriage arms and a container bottom support attached to a vertical beam. The bin carriage frame may also include one or more handles to assist the pivoting motion of the bin carriage with respect to the base during use. The frame of the bin carriage preferably includes at least one means for vertically retaining the refuse container, such as with a container retention member disposed on the vertical support of the bin carriage, or disposed on one or more of the carriage arms, so that the container is secured to the bin carriage of the lifting apparatus after being received. A failure to retain the receptacle within the bin carriage when emptying refuse would require retrieval, emptying, and cleaning of the refuse container before it could be put to further use.

The bottom support of the bin carriage preferably includes at least one wheel, for supporting the weight of the refuse container and allowing transport without the necessity of first tipping the apparatus. The combination of wheels on the base and the frame of the bin carriage allow for engaging and securing a container which may be transported to a disposal chute, dumpster, or the like. In order to prevent movement of the bin carriage during transport, a latching mechanism may be used to releasibly secure, latch, or lock, the bin carriage to the column.

The base column preferably includes a vertical member of sufficient height for temporarily engaging the top edge on the wall of a dumpster or other form of large refuse receptacle. It is preferable that the vertical member be adjustable in height wherein the apparatus may be utilized with refuse receptacles of differing heights. By way of example and not of limitation, a generally hook shaped member is slidably engaged with an upper portion of the lifting apparatus. The hook of the telescoping member is configured to engage the rim of the dumpster or chute in preparation for use of the lifting apparatus. The extension of the telescoping member can be reversibly secured, or temporarily locked into place, such as with a setscrew, pin, or other retention fastener. Additionally, the base column may be configured using additional means of retention, such as a foot that engages the sidewall of the dumpster or chute to simplify achieving proper vertical orientation of the apparatus with respect to the dumpster.

The power for lifting the bin carriage, with an ostensibly full, or partially full, refuse container, may be provided according to a number of alternatives. The invention has been described so far with a manual direct lifting arrangement that guides the lifting and inversion process to speed the unloading process while increasing safety. The bin carriage, or handles attached to the bin carriage, may be grasped and the bin lifted creating a pivot force on the pivot arms which guide the bin carriage and attached refuse container up and over into at least a partially inverted orientation, such as preferably equal to or exceeding a forty five degree downward angle from the horizontal, so that waste materials may fall from the refuse container into a larger refuse receptacle, or chute thereof. Using the present invention for emptying a refuse container, it will be appreciated that the container is guided to simplify lifting and emptying, reduce the awkwardness of the process, and enhance overall safety.

It will be appreciated, however, that the power required for lifting the bin carriage may be provided in a number of alternative forms. Furthermore, the present invention may be configured for receiving either manual or powered operation, to properly support use by persons of differing physical abilities. Additional mechanical advantage may be gained within a manual lifting operation using a power transfer device that receives a manual input. It will be appreciated that a transmission in combination with a hand crank or other manual input may be utilized to increase mechanical advantage in pivoting the pivot arms to raise and invert the bin carriage. Power may be provided to the lift apparatus using engines or motors, hydraulic or pneumatic actuators, and similar mechanical output power sources. In this embodiment, an electric motor and transmission are operably coupled with one of the lever arms and configured to pivot the lever arm upwardly with respect to the base column.

In an alternative embodiment, the base of the apparatus includes a hydraulic system that is operably connected to the long stroke cylinders, which are configured as hydraulic actuators. Actuation of the hydraulic system and long stroke hydraulic actuators pivots the lever arms and controls lifting of the bin carriage. One novel approach contemplated herein allows for temporarily coupling a conventional power tool, such as a cordless drill/screwdriver to the device, wherein the mechanical power source unit (i.e. cordless drill/driver) may be inexpensively utilized in a powered mode when desired, without the drawbacks associated with permanently installed motor drives.

An aspect of the invention is to provide a transport and lift apparatus that efficiently lifts and empties a large refuse container into a dumpster or chute without requiring the user to lift a substantial part of the weight of the container and refuse at awkward angles.

Another aspect of the invention is to provide a refuse container lift that can be easily transported from place of deposit to a dumpster or garbage chute.

Another aspect of the invention is to provide a refuse container lift that is of rugged construction and can be economically manufactured.

Another aspect of the invention is to provide a refuse container lift that is adaptable for use with various standard sized containers as well as dumpsters or chutes of various heights.

Another aspect of the invention is to provide a refuse container lift that may be utilized with wheeled refuse containers.

Another aspect of the invention is to provide a refuse container lift that can be conveniently and reversibly mounted to a dumpster or chute without the use of tools or invasive fasteners.

Another aspect of the invention is to provide a refuse container lifting apparatus that will provide a user with a convenient means for transporting and safely lifting and emptying a container into a waste receptacle.

Another aspect of the invention is to provide a refuse container lifting apparatus that provides powered lifting operation wherein the emptying of the containers may be performed without substantial physical strain on the user.

Further aspects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings that are for illustrative purposes only.

DETAILED DESCRIPTION OF THE INVENTION

Referring more specifically to the drawings, for illustrative purposes the present invention is embodied in the apparatus generally shown in FIG. 1 through FIG. 9, where like reference numbers denote like parts. It will be appreciated that the apparatus may vary as to configuration and as to details of the parts without departing from the basic inventive concepts disclosed herein. The disclosed embodiment of the invention is configured for transporting and lifting a generally cylindrical container such as a conventional wheeled, or unwheeled waste container, also commonly referred to as a garbage can. While a generally cylindrical container is considered for purposes of illustration, it will be understood that the apparatus may be configured to transport and lift containers of essentially any shape.

Figure 1:
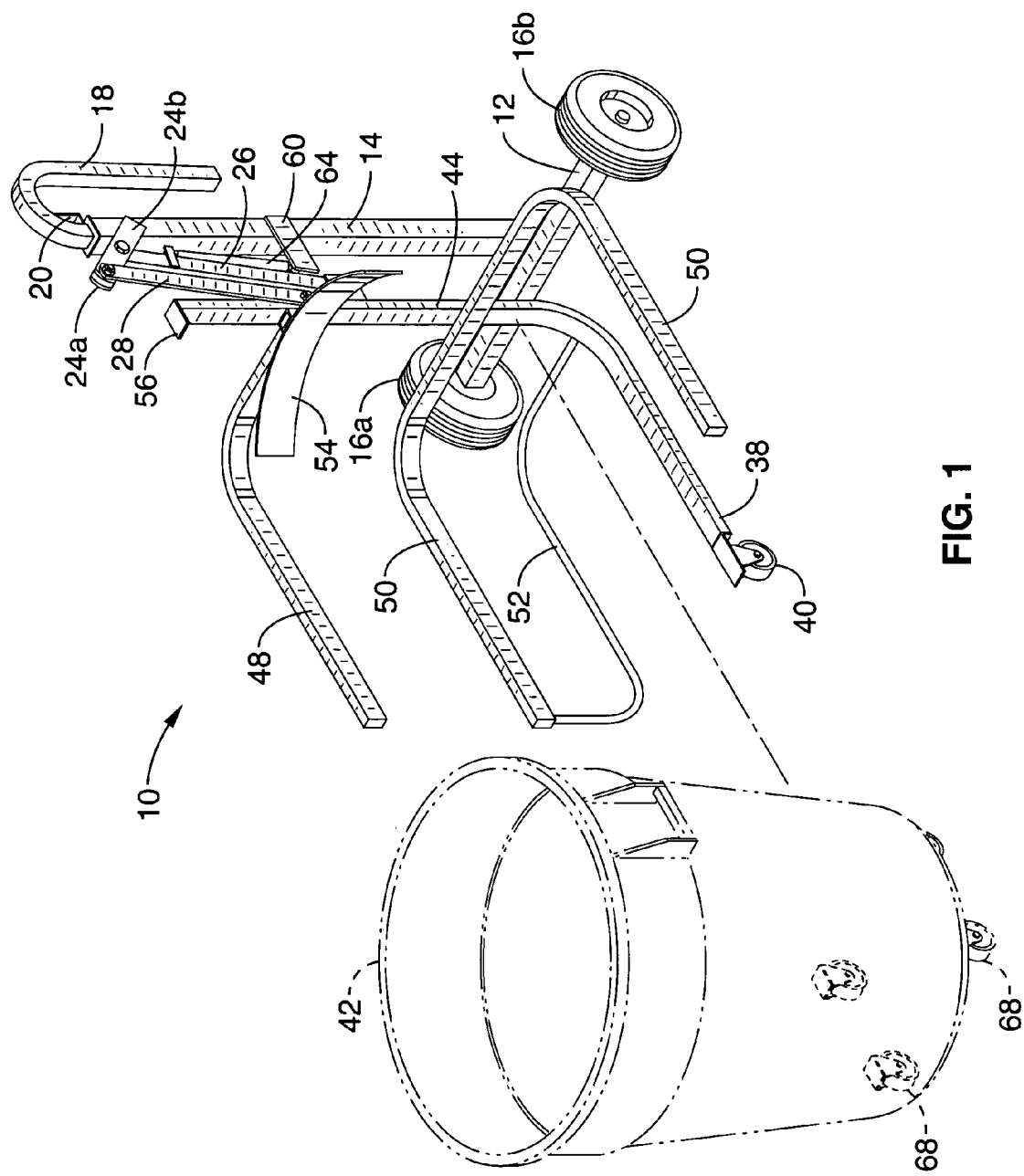
FIG. 1 is a perspective view of a container lift and transport according to the present invention.

Referring first to FIG. 1, the invention 10 comprises a horizontal base 12 that preferably has a vertical column 14 mounted centrally thereon. In the embodiment shown, the base 12 includes a pair of wheels 16a, 16b, that support the base and allows movement (conveyance) of the entire apparatus, such as to a refuse repository.

Figure 2:
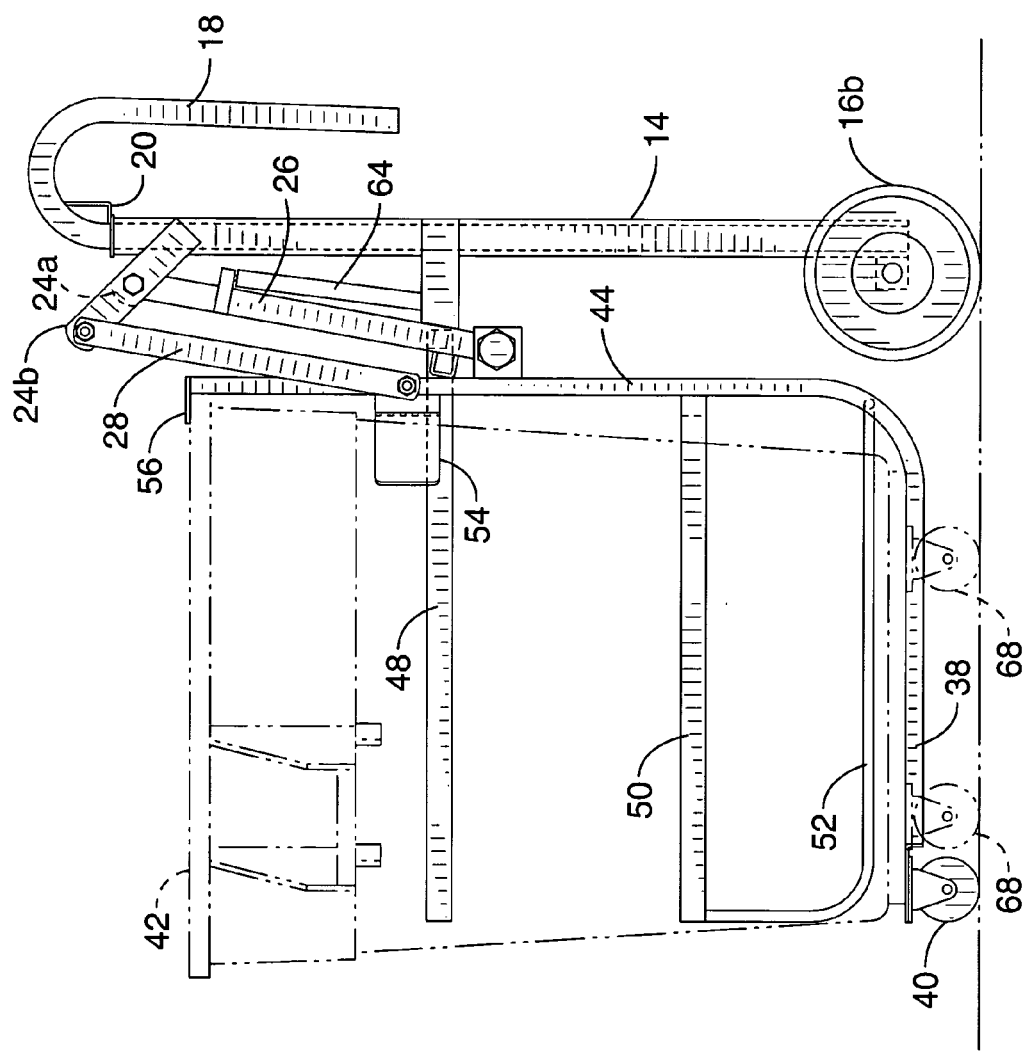
FIG. 2 is a left side view of the embodiment of the apparatus shown in FIG. 1, with a refuse container depicted in dashed lines.
Figure 3:
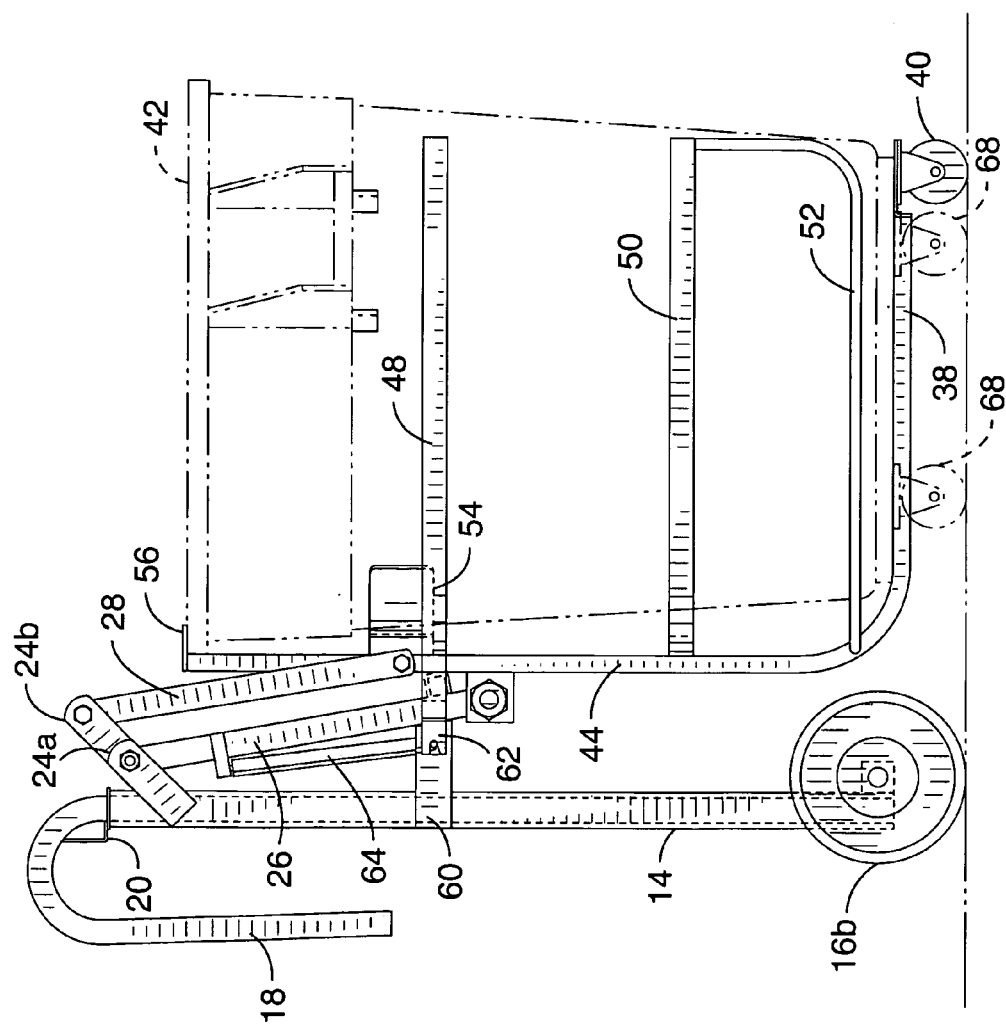
FIG. 3 is a right side view of the embodiment of the apparatus shown in FIG. 1, with a refuse container depicted in dashed lines.
Figure 5A:
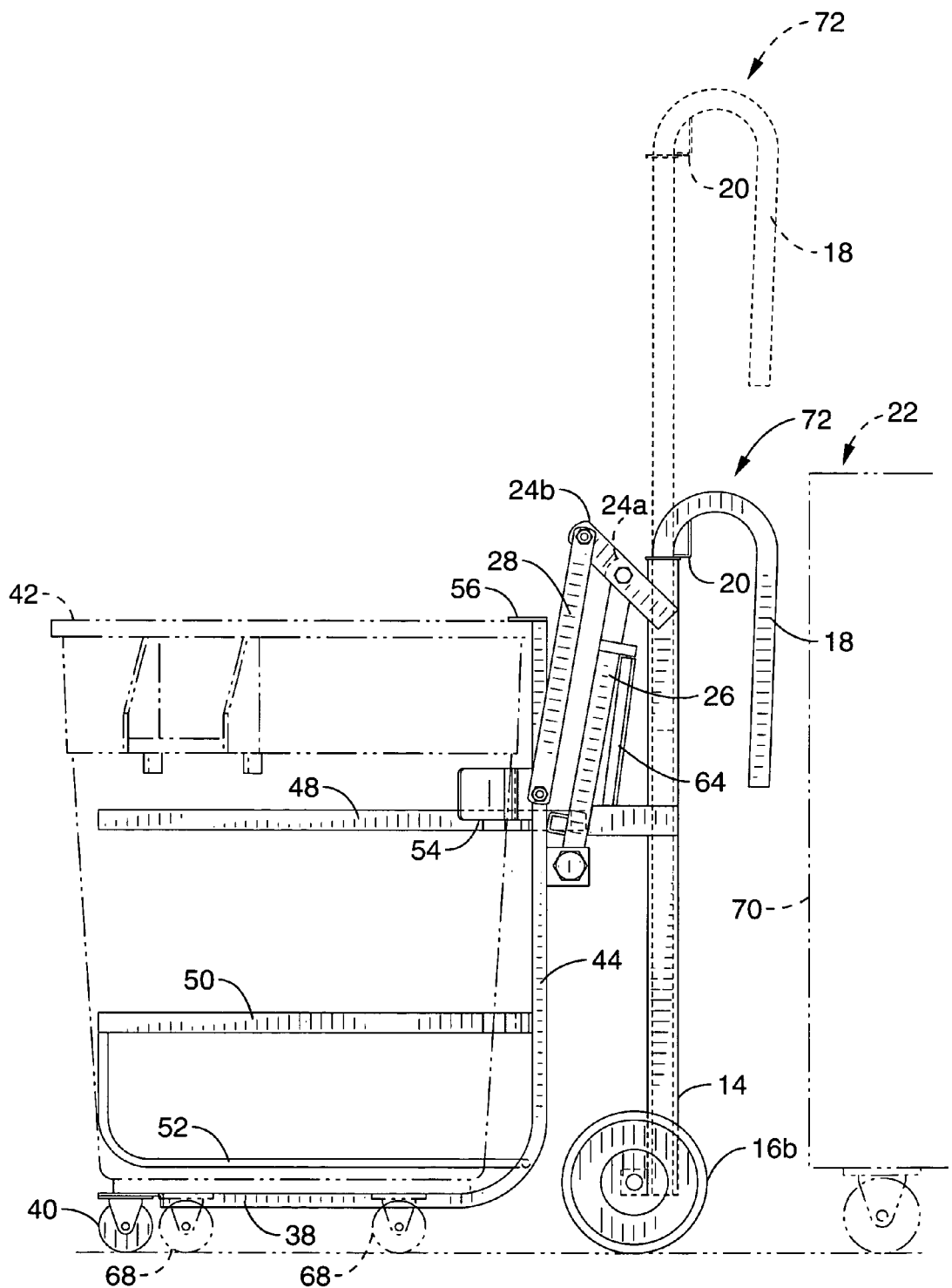
FIG. 5A through FIG. 5D are side views of the apparatus according to FIG. 1 sequentially showing the use of the lift apparatus with a conventional dumpster.
Figure 5B:
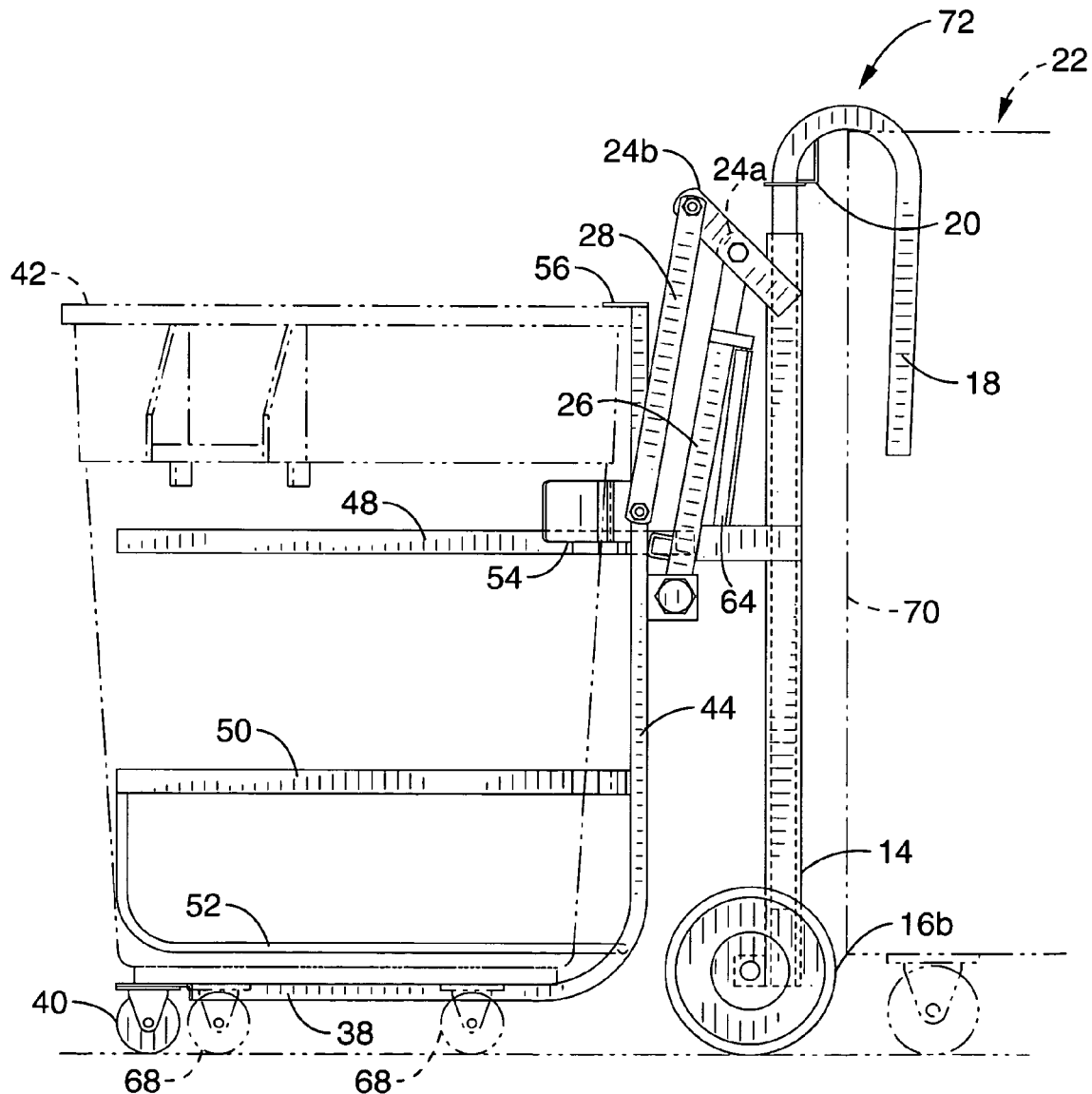

Referring also to FIG. 2 and FIG. 3, it can be seen that the distal end of column 14 has an arcuate telescoping hook 18 that is configured to engage the periphery of a conventional dumpster 22 as shown in FIG. 5B. Optionally, hook 18 may include an angular spacer 20 that further engages the lip and wall of the dumpster and spaces the column 14 from the wall of the dumpster. The telescoping action of the hook 18 may be set in place with a set screw that is tightened down once the hook 18 is positioned on the lip of the dumpster or chute. Hook 18 may also serve as a gripping handle for tipping the apparatus 10 about the axis of the base 12 and manually controlling the transport of the apparatus and any received container from the point of collection to the dumpster, or other form of refuse receptacle.

In the embodiment shown, column 14 also has a set of armature mounts 24a, 24b, which are disposed at an angle from vertical column 14. Right armature mount 24a and left armature mount 24b are preferably mounted parallel to one another and at an upward angle with the horizontal of between approximately twenty-five degrees and approximately sixty-five degrees, with approximately forty-five degrees being preferred.

Figure 4:
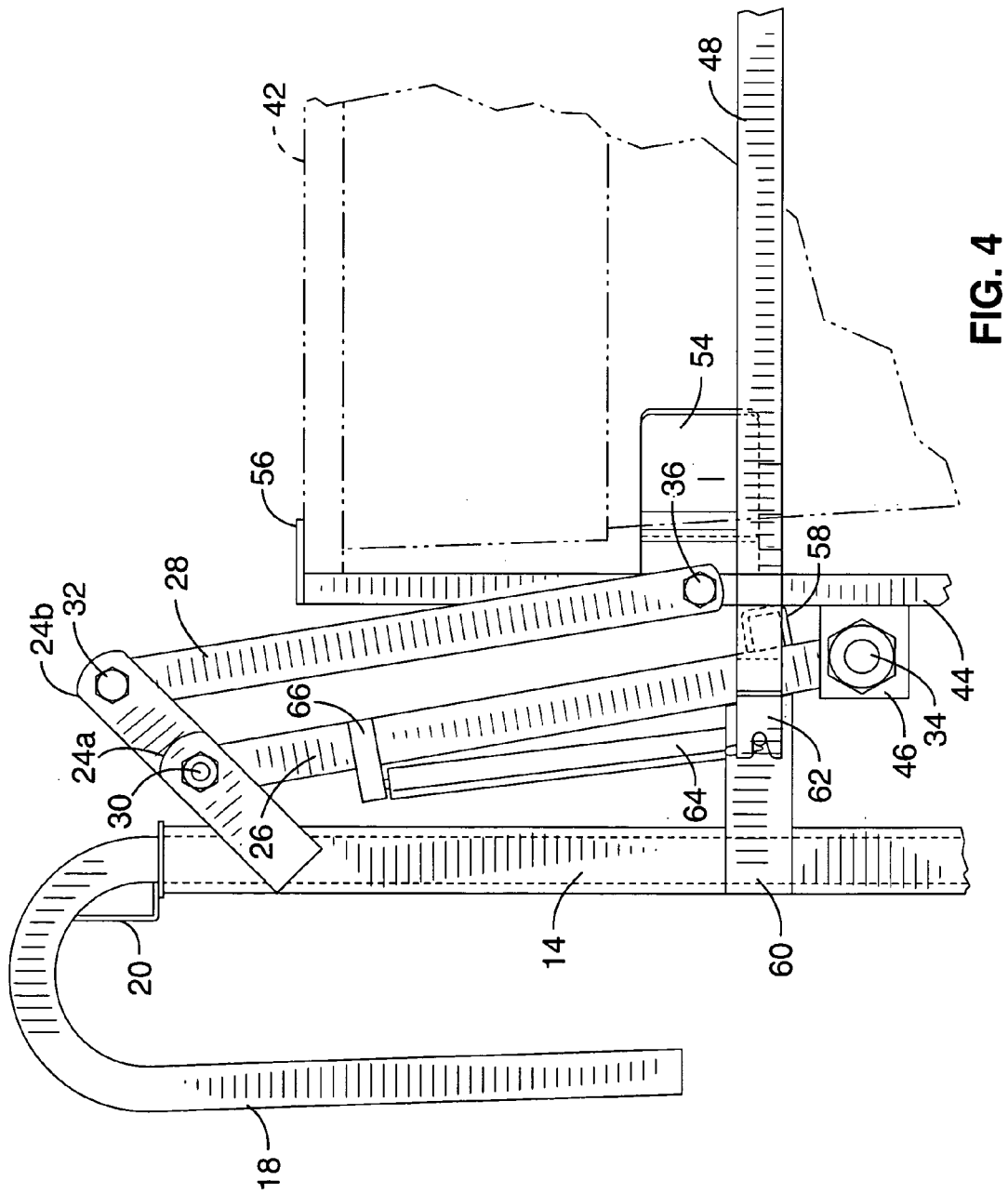
FIG. 4 is a sectional right side view of the linkage portion of the apparatus of the present invention shown in FIG. 1.

Referring also to FIG. 4, a plurality of pivot arms are pivotally coupled to the left and right armature mounts 24a, 24b. In the embodiment shown, armature mounts 24a and 24b are pivotally coupled to a first pivot arm 26 that is disposed on an axle or threaded fastener between mounts 24a, 24b. A second pivot arm 28 is pivotally coupled to the left armature mount 24b. It can be seen that the first pivot arm 26 and the second pivot arm 28 are substantially parallel in orientation when the apparatus is at the resting or down position.

Pivot arms 26, 28, are also pivotally coupled to a container carriage. It can be seen that pivot arms 26, 28, allow the container carriage to move relative to the base 12, column 14 and armature mounts 24a, 24b, by pivoting around the axis of pin 30 and pin 32 respectively. Optionally, pins 30 and 32 may fit within press fit brass bushings, or other rotational fittings, in armature mounts 24a, 24b, that will aid in smooth low resistance rotation about the joints.

Likewise, pivot arms 26 and 28 are pivotally coupled, at the end opposite the armature mounts, to the container carriage with carriage pins 34 and 36 respectively. The pivot pins 34 and 36 allow the axial movement of the container carriage with respect to the pivot arms 26 and 28.

In the embodiment shown, the container carriage is configured to engage a preferably cylindrical refuse container, with or without wheels. The carriage has a horizontal bottom member 38 that preferably has a wheel 40 disposed on the end or bottom surface of bottom member 38. Bottom member 38 can slide between the wheels of the conventional refuse container 42 if the container is equipped with wheels. If container 42 does not have wheels it may be placed in any orientation on the bottom member 38 of the carriage. The container carriage may also incorporate a locking mechanism, such as an insertable locking pin, to prevent movement of the bin carriage in relation to the handle and base during movement of the lifting apparatus. Horizontal base member 38 is preferably coupled with a vertical upright member 44. The container carriage also preferably includes a plurality of horizontal carriage arms that partially encircle refuse container 42. In the embodiment shown, an upper carriage arm 48 is mounted to pivot arm 26 near the point of attachment of the arm to the bin carriage with carriage pin 34. Although shown as a single one-side horizontal rail, upper carriage arm 48 may be extended to span the opposing side as well. Additionally, a lower set of carriage arms 50 are mounted to the vertical upright member 44 of the bin carriage. Upper arm 48 may be utilized as a handle for manually operating the lift or for commencing the manual operation, as it is positioned more advantageously at a high position for initial lifting. Carriage arms 48, 50 are configured to receive a refuse container 42 between the carriage arms as shown in FIG. 1. It will be recognized that additional carriage arms, or alternative structures may be implemented for similarly receiving a refuse container 42 without departing from the teachings herein. Optionally, the lower carriage arms 50 may be adapted with at least one handle 52 that assists in the movement of the carriage with respect to the base 14.

The container carriage also optionally includes an arcuate container rest 54 that is preferably mounted to the upright member 44 of the carriage when used with refuse containers having a circular cross section. The arc of optional container rest 54 preferably approximates the circumference of a cylindrical container such as a conventional "garbage can" 42 so that the container will not shift from its position during use.

The upper most tip of upright member 44 preferably has a horizontal lip 56 that engages the top surface of refuse container 42. It will be appreciated that the top section of upright 44 may be adapted to vertically adjust to accommodate varying sized refuse containers 42.

Referring particularly to FIG. 4, the bin carriage is pivotally coupled to pivot arm 26 and pivot arm 28 with carriage pins 34, 36. Carriage pin 34 is preferably mounted to a flange 46 welded to upright member 44 of the container carriage. Carriage pin 36 is mounted directly to upright member 44 in the embodiment shown. It can be seen that the container carriage can rotate about pins 34 and 36 simultaneously. In the embodiment shown, lower pivot arm 26 has a block 58 that restricts the movement of carriage upright 44 about pin 36 such that upright 44 is approximately vertical when the carriage is at its lowest position. In addition, lower pivot arm 26 preferably engages a generally horizontal stop 60 mounted to column 14. Horizontal stop 60 preferably has a beveled edge that has the same angle as pivot arm 26 when the carriage is at its lowest position. A lock 62 is preferably mounted to stop 60 and pivot arm 26. Lock 62 firmly secures the container carriage with column 14 so that the two components will not separate during conveyance of the apparatus with refuse container from the point of collection to the dumpster.

At least one pivot arm is preferably connected to one or more long stroke cylinders 64 for controlling the movement of the bin carriage, such as for dampening the response of the bin carriage during lifting, and/or upon descent back to the ground. The long stroke cylinder 64, also referred to as a strut, is pivotally mounted at one end to a cylinder-mounting flange 66 on the lower pivot arm 26, in the embodiment shown. The other end of long stroke cylinder 64 is pivotally mounted to horizontal stop 60. Another preferred arrangement is the pairing of long stroke cylinders 64 mounted in parallel which function in unison, and provide balanced lift and redundancy. It should be noted that dampening of the lifting motion provides safety benefits. For example upon intentional or inadvertent release during lifting, the bin carrier with the retained refuse container descend at a controlled rate as a result of the long stroke cylinders 64 whereby the risk of injury to personnel is reduced in addition to impact forces which may otherwise damage, or induce premature wear in the lifting apparatus. The long stroke cylinders 64 are preferably configured to extend upon rotation of pivot arm 26 upwardly about pin 30 and generally resist the opposing downward forces of the container and its contents. It will be appreciated that the long-stroke cylinder may be replaced with a hydraulic cylinder, as part of a hydraulic actuator, as controlled by a hydraulic fluid power source and associated controller, wherein garbage (refuse) containers may then be lifted by actuation of the hydraulic cylinder to raise the container for lifting, wherein subsequent to emptying a refuse container the fluid pressure may be bled to then allow the empty container to be lowered back to the ground. Similarly, a pneumatic actuator may be used to replace or augment the long stroke cylinder, such as coupled through a valve means to a gas pressure source. It will be appreciated that gas, such as air, may be readily compressed into tanks which could provided sufficient power for actuation.

In use, a garbage container 42 is positioned within the bin carriage between lower carriage arms 50 and against container rest 54 as seen in FIG. 5A through FIG. 5D. The bottom of refuse container 42 should be placed on bin carriage bottom member 38 and the top rim of refuse container 42 placed under lip 56 of vertical member 44 of the bin carriage. It is preferred that any wheels on the bin carriage be of a configuration and size, wherein the wheels of refuse container 42 do not interfere with conveyance of the apparatus. It is preferred that wheel 40 be equal to, or larger, than the wheel sizes 68 utilized on wheeled refuse containers that may be disposed therein, wherein the entire apparatus can be pushed or pulled along wheels 16a, 16b, and wheel 40 without the need of first tipping the apparatus back about the axles of wheels 16a and 16b, or interfering with wheels disposed on the refuse container.

FIG. 5A through FIG. 5D depict the operation of the lift apparatus at various stages during the lifting and at least partial inversion of a refuse container. In FIG. 5A and FIG. 5B, refuse has been collected within container 42 and has been transported to a dumpster 22. The apparatus 10 is brought in proximity to the side of dumpster 22 and engaged. The telescoping hook 18 is preferably extended above the sidewall 70 of dumpster 22 and the apparatus 10 is then brought closer to the wall 70 of the dumpster 22 to allow the crook 72 of hook 18 to engage the wall 70 when the hook 18 is retracted within column 14. Hook angle 20 guards against excessive movement by the column 14 and hook 18 during the lifting movement of the bin carriage. In one embodiment, the vertical column 14 has one or more horizontal feet (not shown) that engage the exterior of wall 70 of dumpster 22 to restrict movement of column 14 during the lifting cycle.

Figure 5C:
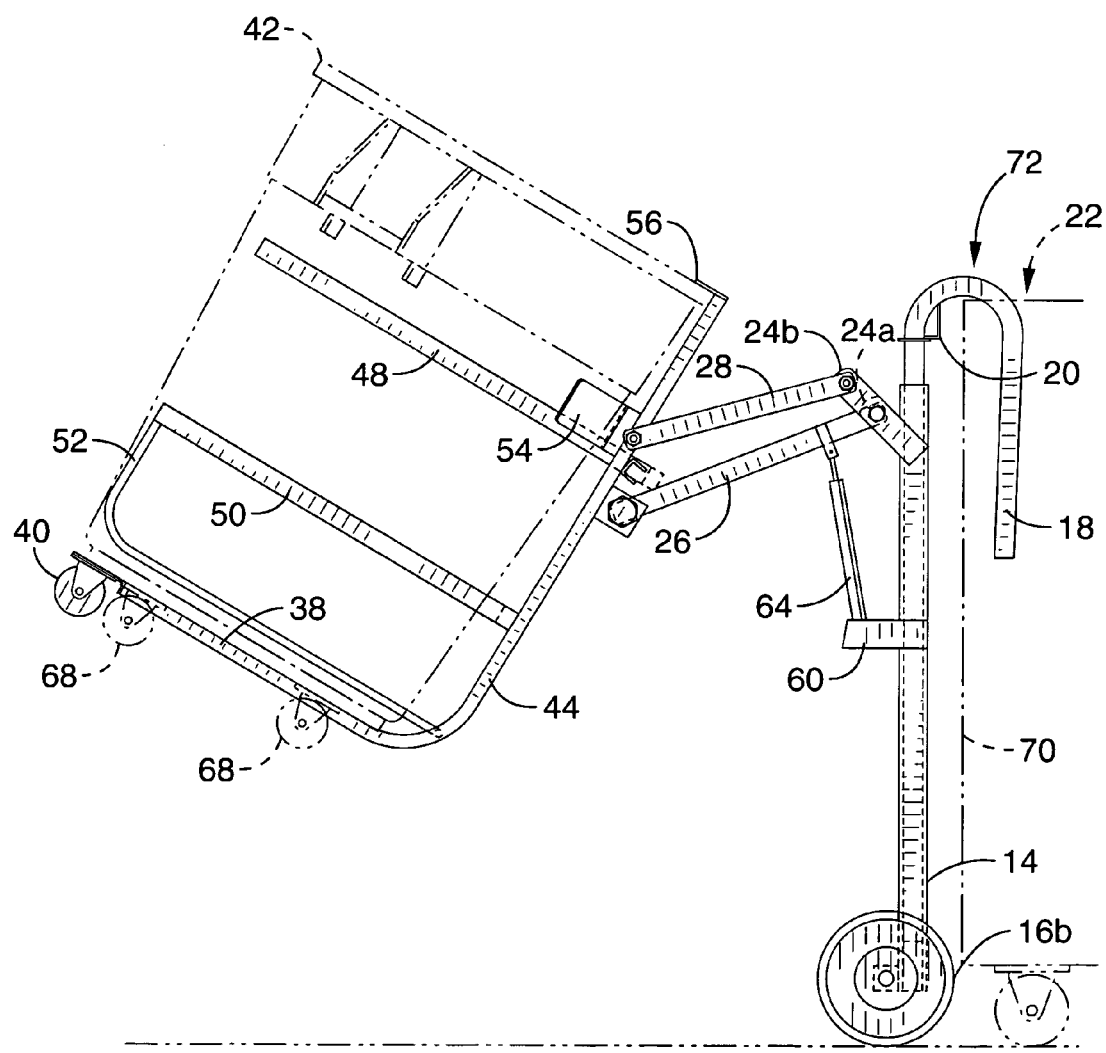
Figure 5D:
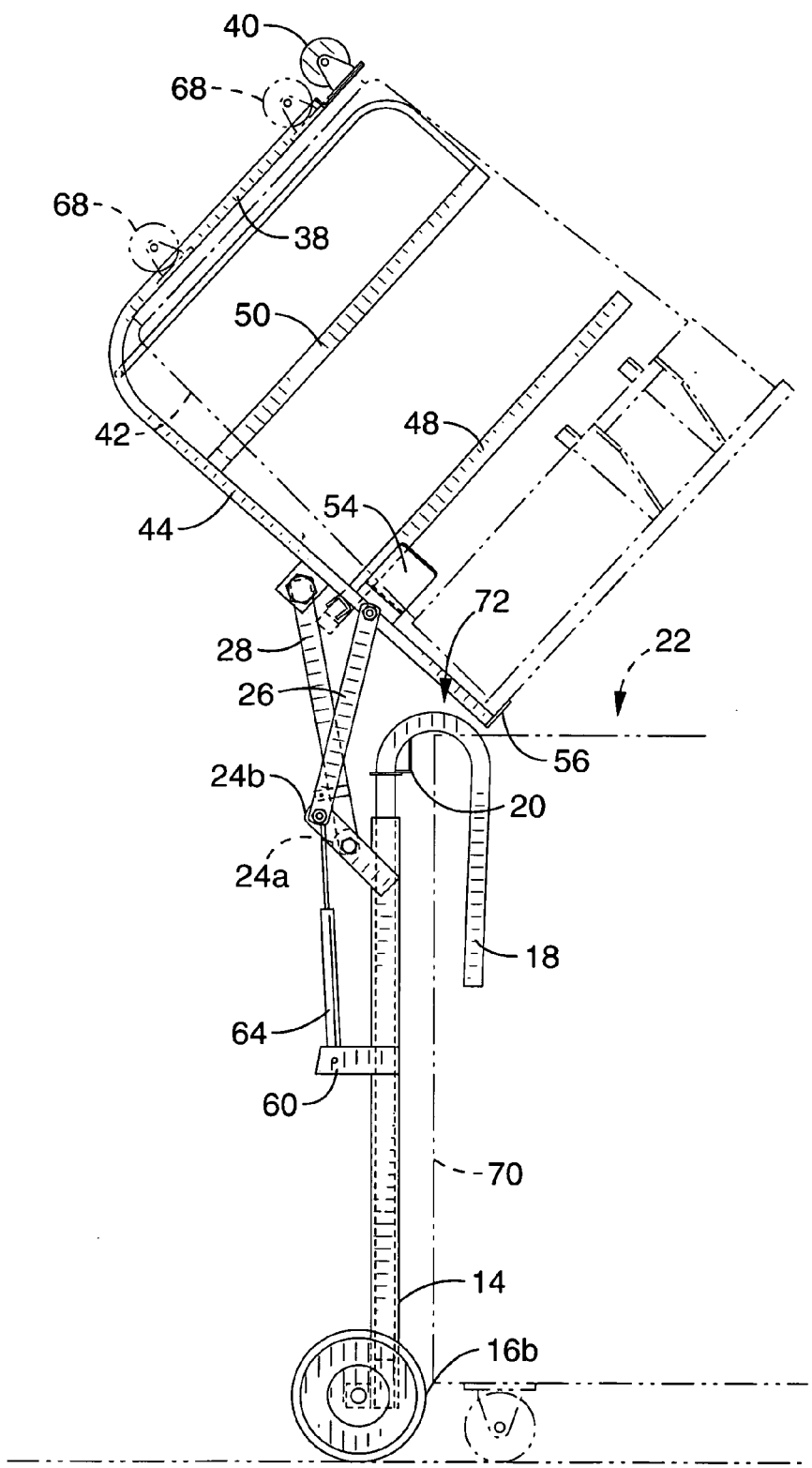

Once the apparatus 10 is temporarily secured to the dumpster or chute, the lock 62 that locks the container carriage with the column 14 is released so that the pivot arms 26 and 28 can pivot freely. It should be appreciated that embodiments may be fabricated using long stroke cylinders 64 that are adapted to provide a significant biasing force, preferably a predetermined value within the range of from 20 to 50 pounds, to aid in lifting the container carriage with its retained refuse container. In such embodiments, the container carriage may require being urged into a down and locked position, such as by having the user step onto carriage bottom member 38 to sufficiently compress the cylinder and engage the lock prior to receiving and optionally transporting a refuse container to a dumpster. As depicted in FIG. 5C and FIG. 5D, the pivot arms 26, 28, the armature mounts 24a, 24b, and the carriage upright 44 create a parallel or four-bar linkage that will allow the bin carriage and refuse container 42 to maintain the proper orientation throughout the lift cycle including inversion. The manual operation embodiment shown in FIG. 5C and FIG. 5D require the user to grasp the handle 52, although they may first lift upper and lower carriage arms 48, 50, and pull and lift the carriage and container causing pivot arms 26 and 28 to rotate about armature pins 30 and 32. At the same time it can be seen that the bin or container carriage also pivots about carriage pins 34 and 36 to change orientation through the lifting cycle shown in FIG. 5C and FIG. 5D. The container 42 is restricted from falling into the dumpster 22 by the lip 56 on upright member 44. Lip 56 may be shaped to better retain the refuse container, such as curved downwardly at its distal end. Lip 56 may also be adapted with a biasing means, such as a spring loaded extension that can be manually extended over the lip of an inserted refuse container to secure it in place within the apparatus. While a lip on upright 44 of the bin carriage is used as a means for securing refuse container 42 in the bin carriage, it will be understood that other methods of restraining vertical motion may be alternatively utilized to secure the container. For example, an embodiment may be implemented using a spring biased hook (not shown) mounted to carriage upright 44 to hook the lip of refuse container 42 and thereby secure the container 42 in the container carriage. In another embodiment, resilient straps (not shown) attached to arms 48 or 50 may also be utilized for securing refuse container 42 within the bin carriage.

The length of pivot arm 28 determines the angle of the container when it is substantially inverted at the end of the lift cycle seen in FIG. 5D. Once the contents of refuse container 42 are emptied into dumpster 22, the lift cycle is complete and the sequence is reversed and the carriage and container are brought back to the bottom position. The carriage and column are locked with lock 62 and hook 18 extended and removed from engagement with dumpster 22. The empty container can then be transported to any desired location for filling.

Figure 6:
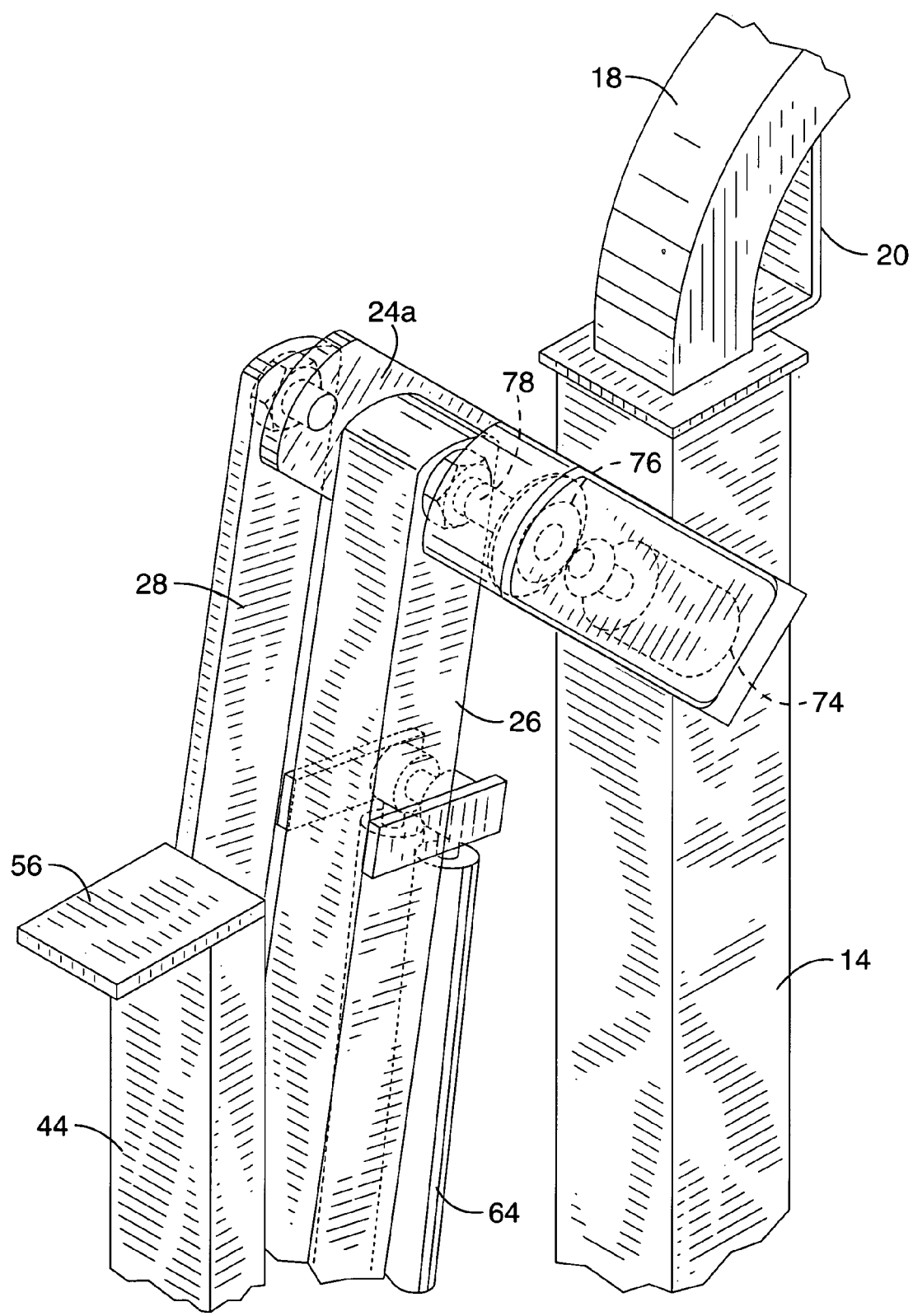
FIG. 6 is a perspective view of an alternative embodiment of the container lift and transporter of the present invention having a motor and transmission.

Turning now to FIG. 6, an alternative embodiment of the invention is generally shown, by way of a powered embodiment capable of powering the lifting cycle without the application of manual force. Preferably, an electric motor to which batteries are coupled through a control means (not shown), is utilized to provide the mechanical lifting power applied to rotating (pivoting) pivot arms 26, 28. A control means may be configured from a switch which may incorporate a reversing position (i.e. DPDT switch) attached to the lift apparatus, in addition solid state controllers and other alternative control devices may be utilized to control the power to the electric motor. This embodiment generally represents a motor 74 and transmission 76, operably connected to an axle that is welded to pivot arm 26, to provide rotation of pivot arm 26. The activation of motor 74 causes transmission 76 to rotate the axle 78 and pivot arm 26 to lift the bin carriage through its lift cycle. In one embodiment, the motor is reversible and the carriage can be reversibly raised and lowered.

Motor 74, and transmission 76, are not shown to scale herein, and may be mounted at alternative locations on the lifting apparatus, such as near the base or along vertical column 14, with force being conveyed from the motor via a transmission to the pivot arms to provide lifting power for the bin carriage. Alternatively, the element shown as motor 74 may simply comprise a head piece 74, adapted for engaging transmission 76, or that extends from a transmission 76, which may be temporarily engaged by a manual input device, such as a hand crank (not shown), or more preferably by a self contained mechanical power device (not shown), such as a battery powered drill/driver unit. By way of example, and not of limitation, the head piece may comprise a large hex head that may be engaged with a socket drive of the drill/driver, or a shaft (preferably with exterior facets) to which the drill/driver may be connected. The use of a self-contained mechanical power source alleviates the need to provide a permanent source of power, such as electrical, hydraulic, or pneumatic, at the location where the containers are to be emptied. It will be appreciated that conventional motors most typically operate from line voltages, generally 110 VAC, 208 VAC three phase, or 220 VAC, which could pose a significant electrocution hazard when utilized within a powered lift that is affixed to an outdoor dumpster and exposed to vandalism, waste materials (liquids, slurries, and particulates), and the environment. In contrast, the temporary use of a power tool for providing lift power has a number of advantages, such as lowered initial and lifecycle costs, and a reduction in problems associated with theft, vandalism, and environmental damage to which a fixed power unit may be subjected. Furthermore, providing the ability to temporarily couple a low cost power source to the unit allows workers to select whether they want to use the lift in a manual or powered mode. Workers having limited physical strength, or workers rehabilitating from an injury, can then elect to use the powered mode of the device for lifting the refuse containers for being emptied.

While a motor and a transmission are the preferred means for powering the upward motion of pivot arm 26, it will be understood by those skilled in the art that alternative methods are within the scope of the invention to assist the lifting motion of the apparatus. For example, long stroke cylinder 64 may comprise a hydraulic or pneumatic system, as mentioned, that is coupled to a hydraulic or pneumatic source whose output may be controlled by the user of the lifting apparatus. A refillable high-pressure pneumatic tank for example may be fitted to the unit to provide for a number of operating cycles.

Furthermore, it will be appreciated that manual lifting of the carriage may itself be performed using less physical strength by providing additional mechanical advantage within the lift apparatus. For example, a manual input device may be incorporated with a reduction transmission, or other force amplification means, to allow raising and lowering of the bin carriage with less muscular strain. For example, a crank assembly may be coupled to a simple power coupling or transmission 76, such as through a gearbox, worm gear, cables, and so forth, to provide a mechanical advantage in lifting the bin carriage without the need of power devices such as motors, hydraulics, and so forth.

It is very advantageous that after emptying a waste container, the lift apparatus is removed from the dumpster or other refuse receptacle, and may be securely stored to prevent damage from vandalism and the elements. Furthermore, since the refuse receptacles are routinely emptied in a lifting procedure, and in some cases may be swapped out with other receptacles of a similar construction, it is again quite beneficial that the present lift apparatus is not permanently mounted and does not require any special adaptations to be made to the dumpster, or similar refuse repository, into which waste containers are to be emptied. It will be appreciated that a lift apparatus permanently mounted to the ground or to a dumpster suffers from additional problems, due to the need to remove and remount, the difficulties with use on various replacement dumpsters, and the risk of damage from the trucks when automatically removing, emptying, and replacing dumpsters.

Figure 7:
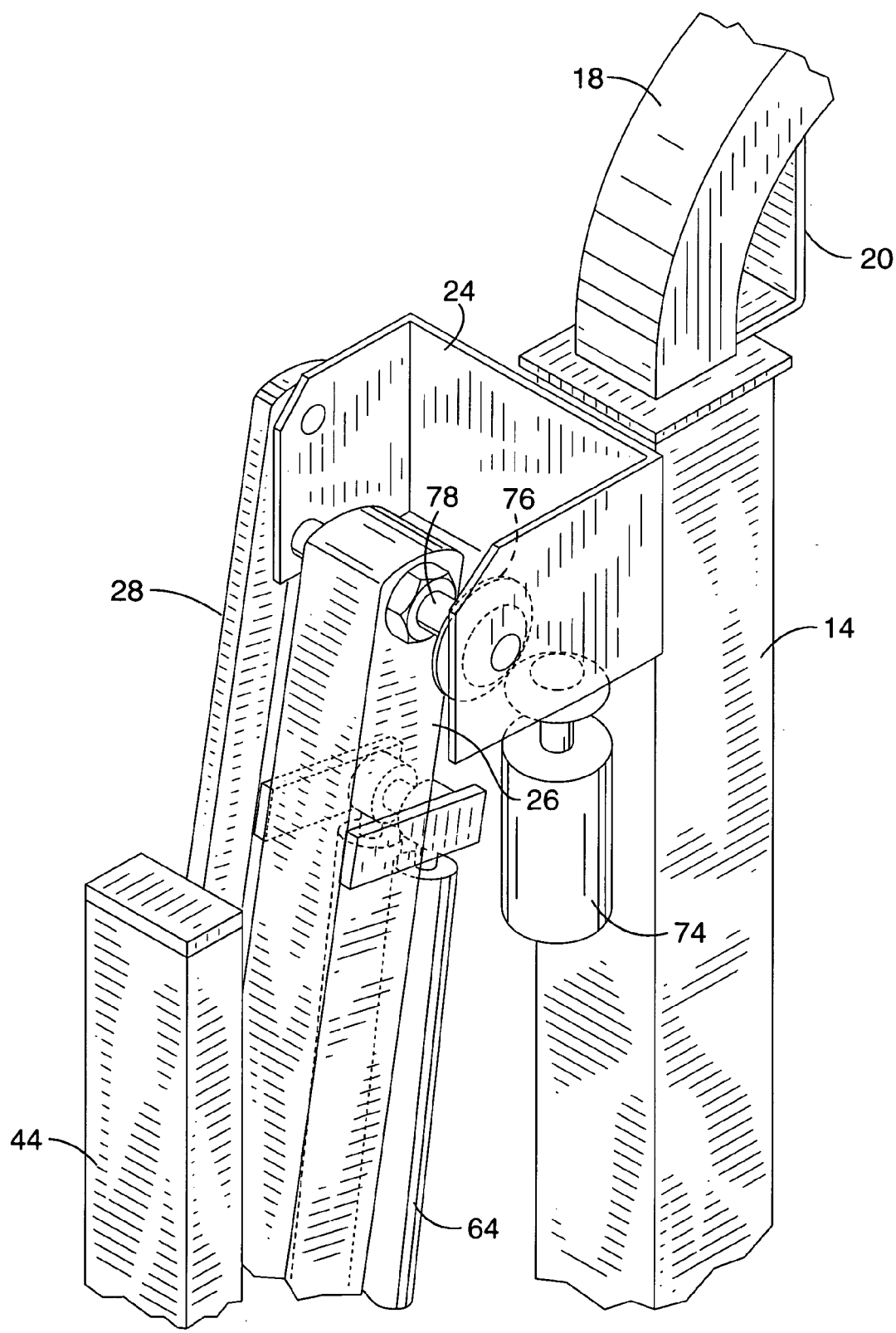
FIG. 7 is a perspective view of an alternative embodiment of the present invention utilizing an integrated armature mount.

FIG. 7 depicts an alternative embodiment of the invention using a one piece armature mount 24 to replace the separate armature mounting arms 24a, 24b, disposed at an angle from vertical column 14. Use of integrated mount 24 in some cases may simplify construction of the apparatus. Motor 74 in this embodiment is shown in a more preferred orientation and coupled through a transmission 76, albeit a simple one, for applying a rotational force to a pivot member. It will be noted that lip 56 has been removed in this embodiment in favor of an alternative refuse container retention device shown in FIG. 8.

Figure 8:
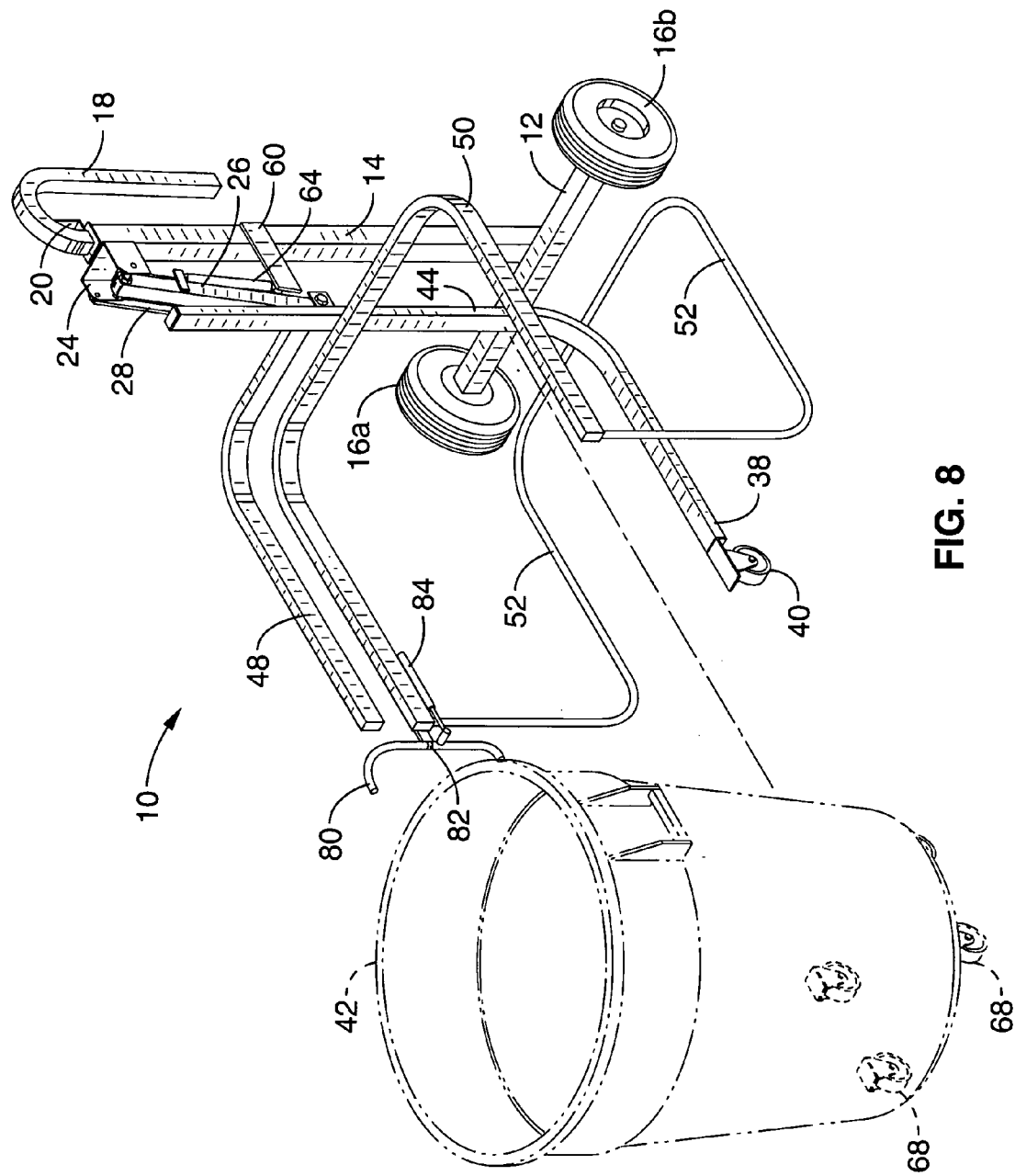
FIG. 8 is a perspective view of an alternative embodiment of the present invention shown with a rotating waste container retention arm.

FIG. 8 depicts a variation of the apparatus with an altered lower arm 50. Lower arm 50 is shown positioned at a higher elevation in the device and closer in proximity to upper arm 48, which may then be outwardly extended, providing separation with the retained refuse container, to enhance its use as a handle when manually operating the lift apparatus. Furthermore, lower handle 52 is shown extending across both sides of the bin carriage. Horizontal lip 56 for engaging the top surface of refuse container 42, has been replaced with a rotating mechanism that provides more secure retention of the refuse container during inversion. A retention arm 80 is shown attached within a rotating mount 82 and biasing member 84, exemplified by a gas spring, that urges a portion of the retention arm into position above the refuse container, wherein upon inversion of the refuse container, such as above a dumpster or chute, the container is unable to work free from the bin carriage. It will be appreciated that the biasing member may comprise a spring or other compliant member adapted for biasing the retention arm 80. Alternatively, detented retention members, compliant straps, and other forms of retention mechanisms may be implemented to prevent the refuse container from becoming disengaged from the lifting apparatus during the lifting process. This swing arm mechanism may also be configured with vertical compliance, such as a spring device (not shown), to urge the retention arm downwardly against the upper surface of the refuse container being retained, wherein different sized containers may be utilized with the lifting apparatus and will be retained therein without significant position shifting as the bin carriage moves toward an inverted attitude.

Figure 9:
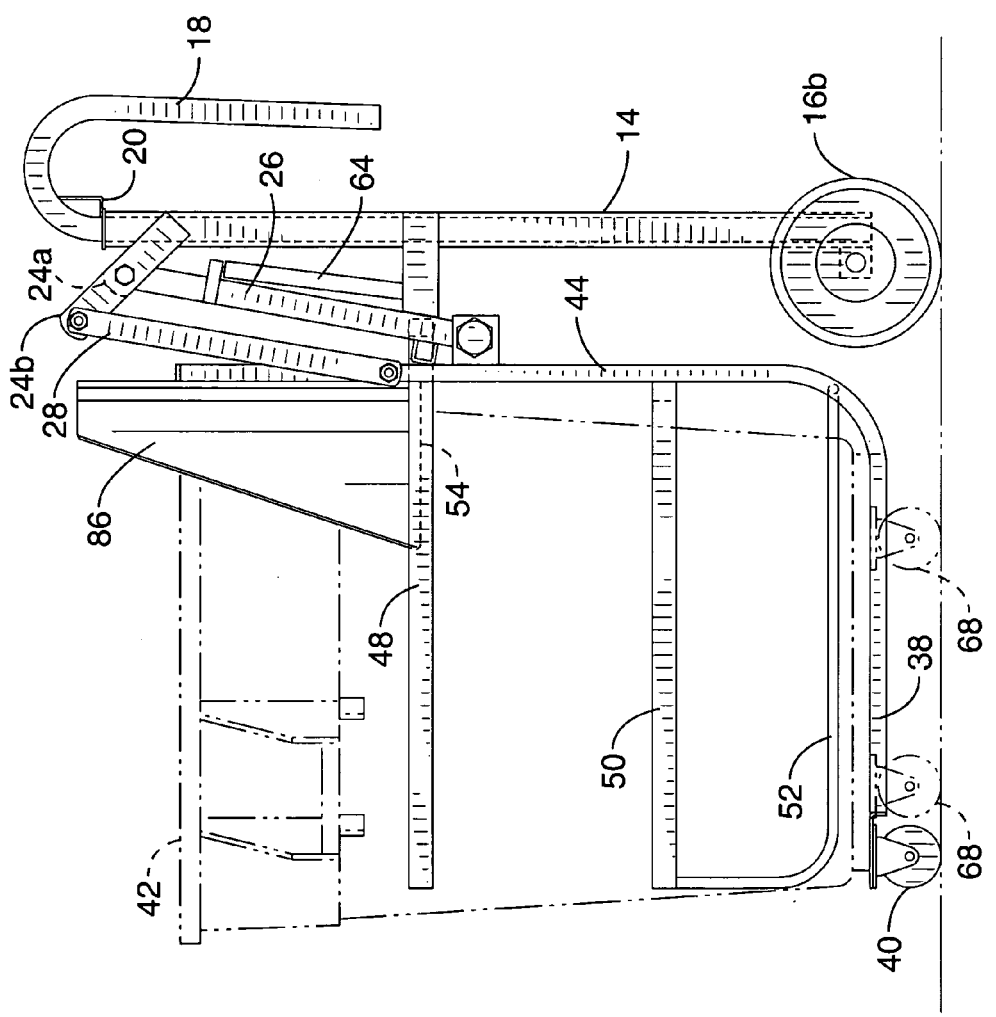
FIG. 9 is a perspective view of an alternative embodiment of the present invention shown with an unloading chute for directing the flow of refuse during inversion.

FIG. 9 depicts an optional shroud 86, also referred to as a chute, which may be attached (permanently or temporarily) to the lift apparatus to constrain the disbursion pattern of the refuse that is being emptied from the refuse container as the bin carriage approaches an inverted attitude. The shroud 86 is particularly useful in situations in which the refuse must be received along a narrow path, such as when emptying the garbage into a chute attached to a garbage collection system or large refuse repository.

Accordingly, it will be seen that this invention provides a simple and effective way of transporting and dumping waste containers into a dumpster or waste chute. The lift apparatus is both easy to manufacture and use, while it may be adapted for use in manual modes as well as various power modes. It should be appreciated that the specific linkages and structures of the present invention may be implemented in a number of ways by one of ordinary skill in the art to provide an equivalent lift apparatus, without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for transporting and lifting, toward at least partial inversion, a refuse container, comprising:
   a frame having at least two wheels adapted to provide rollable transport thereof;
   a column connected to said frame:
   means for coupling said column to a refuse depository, said means for coupling said column to a refuse depository comprises an extendable member for temporarily engaging a top edge of said refuse depository;
   a bin carriage adapted for receiving a refuse container;
   a plurality of angularly offset parallel pivot arms coupled between said column and said bin carriage;
   wherein said pivot arms are adapted to, in response to an applied pivot force, guide said bin carriage upwardly and impart a rotation thereof resulting in at least partial inversion of said refuse container; and
   means for generating said pivot force.

2. An apparatus as recited in claim 1, wherein said extendable member is adapted for being locked into an engagement position with the top edge of said refuse depository.

3. An apparatus as recited in claim 1, further comprising:
   means for reversibly locking said bin carriage into a fixed position in relation to said column.

4. An apparatus as recited in claim 1, wherein said bin carriage comprises:
   a generally horizontal base adapted for supporting the bottom surface of a refuse container retained within said bin carriage;
   an upright mounted to said base, said upright pivotally coupled to said pivot arms; and
   a plurality of substantially horizontal rails mounted to said upright.

5. An apparatus as recited in claim 4, wherein said plurality of horizontal rails comprises:
   at least one horizontal rail mounted at a first height to said upright; and
   at least one horizontal rail mounted at a second height, below said first height, to said upright.

6. An apparatus as recited in claim 4, further comprising at least one handle member attached to at least one of said horizontal rails.

7. An apparatus recited in claim 4, wherein said base of said bin carriage further includes at least one wheel adapted for supporting the weight of said bin carriage along with said refuse container.

8. An apparatus as recited in claim 4, wherein said bin carriage further comprises a refuse chute attached proximal to an upper end of said bin carriage adapted for directing the contents of said refuse container during inversion for controlling the disbursion of contents while being emptied.

9. An apparatus as recited in claim 4, wherein said bin carriage further comprises means for vertically retaining said refuse container within said bin carriage during said inversion.

10. An apparatus as recited in claim 9, wherein said means for vertically retaining said refuse container comprises a lip disposed on said upright adapted to engage an upper surface of said refuse container during inversion of said refuse container to restrain vertical motion of said refuse container.

11. An apparatus as recited in claim 9, wherein said means for vertically retaining said refuse container comprises a retention member attached to said bin carriage and adapted for positioning above said refuse container prior to inversion.

12. An apparatus as recited in claim 11, wherein said retention member is biased toward a position above said refuse container that prevents it from disengaging from said bin carriage during inversion.

13. An apparatus as recited in claim 1, further comprising at least one long stroke cylinder pivotally coupled between said column and at least one of said pivot arms, said cylinder configured to dampen the motion of said pivot arm.

14. An apparatus as recited in claim 1, wherein said pivot force is provided by manually operated means for mechanical force transfer for lifting said bin carriage from a first position to a second position.

15. An apparatus as recited in claim 1, wherein said means for generating said pivot force comprises a power transfer device adapted to translate a mechanical input to a mechanically advantaged output for driving the position of said pivot arms.

16. An apparatus as recited in claim 1, wherein said power transfer device comprises a manual input coupled to a transmission having an output coupled to said pivot arms and adapted for imparting said pivot force thereto.

17. An apparatus as recited in claim 1, wherein said means for generating said pivot force comprises a mechanical power output device adapted for imparting sufficient force to said pivot arms to generate said lifting motion.

18. An apparatus as recited in claim 17, wherein said mechanical power output device is selected from the group of mechanical power output devices consisting essentially of engines, electric motors, hydraulic actuators, and pneumatic actuators.

19. An apparatus as recited in claim 17, wherein said mechanical power output device comprises an electric motor in combination with a transmission.

20. An apparatus as recited in claim 1, wherein said means for generating said pivot force comprises a transmission adapted to receive mechanical input power from a portable device providing a mechanical output of sufficient force when coupled to said pivot arms through said transmission to generate said lifting motion.

21. An apparatus for transporting and lifting, toward at least partial inversion, a refuse container, comprising:
a bin carriage adapted for receiving a refuse container;
a frame having at least two wheels adapted to provide rollable transport of said bin carriage;
means for lifting and rotating said bin carriage for at least partial inversion of a refuse container received by said bin carriage, wherein said means for lifting and rotating said bin carriage comprises:
a column connected to said frame; and
a plurality of angularly offset parallel pivot arms coupled between said column and said bin carriage;
wherein said pivot arms are adapted to, in response to a pivot force, guide said bin carriage upwardly and impart a rotation thereof resulting in at least partial inversion of said refuse container;
means for coupling said column to a refuse depository, wherein said means for coupling said column to a refuse depository comprises an extendable member for temporarily engaging a top edge of said refuse depository; and
means for generating said pivot force.

22. An apparatus as recited in claim 21, wherein said extendable member is adapted for being locked into an engagement position with the top edge of said refuse depository.

23. An apparatus as recited in claim 21, further comprising:
means for reversibly locking said bin carriage into a fixed position in relation to said column.

24. An apparatus as recited in claim 21, wherein said bin carriage comprises:
a generally horizontal base adapted for supporting the bottom surface of a refuse container retained within said bin carriage;
an upright mounted to said base, said upright pivotally coupled to said pivot arms; and
a plurality of substantially horizontal rails mounted to said upright.

25. An apparatus as recited in claim 21, wherein said plurality of horizontal rails comprises:
at least one horizontal rail mounted at a first height to said upright; and
at least one horizontal rail mounted at a second height, below said first height, to said upright.

26. An apparatus as recited in claim 24, further comprising at least one handle member attached to at least one of said horizontal rails.

27. An apparatus recited in claim 24, wherein said base of said bin carriage further includes at least one wheel adapted for supporting the weight of said bin carriage along with said refuse container.

28. An apparatus recited in claim 24, wherein said bin carriage further comprises a refuse chute attached proximal to an upper end of said bin carriage adapted for directing the contents of said refuse container during inversion for controlling the disbursion of contents while being emptied.

29. An apparatus as recited in claim 24, wherein said bin carriage further comprises means for vertically retaining said refuse container within said bin carriage during said inversion.

30. An apparatus as recited in claim 29, wherein said means for vertically retaining said refuse container comprises a lip disposed on said upright adapted to engage an upper surface of said refuse container during inversion of said refuse container to restrain vertical motion of said refuse container.

31. An apparatus as recited in claim 29, wherein said means for vertically retaining said refuse container comprises a retention member attached to said bin carriage and adapted for positioning above said refuse container prior to inversion.

32. An apparatus as recited in claim 31, wherein said retention member is biased toward a position above said refuse container that prevents it from disengaging from said bin carriage during inversion.

33. An apparatus as recited in claim 24, further comprising at least one long stroke cylinder pivotally coupled between said column and at least one of said pivot arms.

34. An apparatus as recited in claim 21, wherein said pivot force is provided by manually operated means for mechanical force transfer for lifting said bin carriage from a first position to a second position.

35. An apparatus as recited in claim 21, wherein said means for generating said pivot force comprises a power transfer device adapted to translate a mechanical input to a mechanically advantaged output for driving the position of said pivot arms.

36. An apparatus as recited in claim 21, wherein said power transfer device comprises a manual input coupled to a transmission having an output coupled to said pivot arms and adapted for imparting said pivot force thereto.

37. An apparatus as recited in claim 21, wherein said means for generating said pivot force comprises a mechanical power output device adapted for imparting sufficient force to said pivot arms to generate said lifting motion.

38. An apparatus as recited in claim 37, wherein said mechanical power output device is selected from the group of mechanical power output devices consisting essentially of engines, electric motors, hydraulic actuators, and pneumatic actuators.

39. An apparatus as recited in claim 37, wherein said mechanical power output device comprises an electric motor in combination with a transmission.

40. An apparatus as recited in claim 21, wherein said means for generating said pivot force comprises a transmission adapted to receive mechanical input power from a portable device providing a mechanical output of sufficient force when coupled to said pivot arms through said transmission to generate said lifting motion.

41. An apparatus for transporting and lifting, toward at least partial inversion, a refuse container, comprising:
a frame having at least two wheels adapted to provide rollable transport thereof;
a column connected to said frame;
a bin carriage adapted for receiving a refuse container;
a plurality of angularly offset parallel pivot arms coupled between said column and said bin carriage;
wherein said pivot arms are adapted to, in response to an applied pivot force, guide said bin carriage upwardly and impart a rotation thereof resulting in at least partial inversion of said refuse container;
means for coupling said column to a refuse depository, wherein said means for coupling said column to a refuse depository comprises an extendable member for temporarily engaging a top edge of said refuse depository; and
means for generating said pivot force.

42. An apparatus as recited in claim 41, wherein said extendable member is adapted for being locked into an engagement position with the top edge of said refuse depository.

43. An apparatus as recited in claim 41, further comprising:
means for reversibly locking said bin carriage into a fixed position in relation to said column.

44. An apparatus as recited in claim 41, wherein said bin carriage comprises:
a generally horizontal base adapted for supporting the bottom surface of a refuse container retained within said bin carriage;
an upright mounted to said base, said upright pivotally coupled to said pivot arms; and
a plurality of substantially horizontal rails mounted to said upright.

45. An apparatus as recited in claim 44, wherein said plurality of horizontal rails comprises:
at least one horizontal rail mounted at a first height to said upright; and
at least one horizontal rail mounted at a second height, below said first height, to said upright.

46. An apparatus as recited in claim 44, further comprising at least one handle member attached to at least one of said horizontal rails.

47. An apparatus recited in claim 44, wherein said base of said bin carriage further includes at least one wheel adapted for supporting the weight of said bin carriage along with said refuse container.

48. An apparatus recited in claim 44, wherein said bin carriage further comprises a refuse chute attached proximal to an upper end of said bin carriage adapted for directing the contents of said refuse container during inversion for controlling the disbursion of contents while being emptied.

49. An apparatus as recited in claim 44, wherein said bin carriage further comprises means for vertically retaining said refuse container within said bin carriage during said inversion.

50. An apparatus as recited in claim 49, wherein said means for vertically retaining said refuse container comprises a lip disposed on said upright adapted to engage an upper surface of said refuse container during inversion of said refuse container to restrain vertical motion of said refuse container.

51. An apparatus as recited in claim 49, wherein said means for vertically retaining said refuse container comprises a retention member attached to said bin carriage and adapted for positioning above said refuse container prior to inversion.

52. An apparatus as recited in claim 51, wherein said retention member is biased toward a position above said refuse container that prevents it from disengaging from said bin carriage during inversion.

53. An apparatus as recited in claim 44, further comprising at least one long stroke cylinder pivotally coupled between said column and at least one of said pivot arms, said cylinder configured to dampen the motion of said pivot arm.

54. An apparatus as recited in claim 41, wherein said pivot force is provided by manually operated means for mechanical force transfer for lifting said bin carriage from a first position to a second position.

55. An apparatus as recited in claim 41, wherein said means for generating said pivot force comprises a power transfer device adapted to translate a mechanical input to a mechanically advantaged output for driving the position of said pivot arms.

56. An apparatus as recited in claim 41, wherein said power transfer device comprises a manual input coupled to a transmission having an output coupled to said pivot arms and adapted for imparting said pivot force thereto.

57. An apparatus as recited in claim 41, wherein said means for generating said pivot force comprises a mechanical power output device adapted for imparting sufficient force to said pivot arms to generate said lifting motion.

58. An apparatus as recited in claim 57, wherein said mechanical power output device is selected from the group of mechanical power output devices consisting essentially of engines, electric motors, hydraulic actuators, and pneumatic actuators.

59. An apparatus as recited in claim 57, wherein said mechanical power output device comprises an electric motor in combination with a transmission.

60. An apparatus as recited in claim 41, wherein said means for generating said pivot force comprises a transmission adapted to receive mechanical input power from a portable device providing a mechanical output of sufficient force when coupled to said pivot arms through said transmission to generate said lifting motion.

* * * * *